(12) United States Patent  (10) Patent No.: US 8,780,049 B2
Jeong et al.  (45) Date of Patent: Jul. 15, 2014

(54) ALPHABETIC CHARACTER INPUT APPARATUS AND METHOD THEREOF

(75) Inventors: Young Seok Jeong, Seoul (KR); Seon Hye Chung, Seoul (KR); Tae Han Kim, Seoul (KR)

(73) Assignee: Any Future Technology Co., Ltd., Seoul (KR)

( * ) Notice: Subject to any disclaimer, the term of this patent is extended or adjusted under 35 U.S.C. 154(b) by 510 days.

(21) Appl. No.: 13/121,425

(22) PCT Filed: Sep. 25, 2009

(86) PCT No.: PCT/KR2009/005494
§ 371 (c)(1),
(2), (4) Date: Mar. 29, 2011

(87) PCT Pub. No.: WO2010/036056
PCT Pub. Date: Apr. 1, 2010

(65) Prior Publication Data
US 2011/0175819 A1    Jul. 21, 2011

(30) Foreign Application Priority Data
Sep. 29, 2008 (KR) .................. 10-2008-0095066

(51) Int. Cl.
*G06F 3/02* (2006.01)
*H01H 21/86* (2006.01)
*H04M 1/00* (2006.01)

(52) U.S. Cl.
USPC ........... 345/169; 345/168; 345/172; 178/101; 455/566

(58) Field of Classification Search
USPC .................... 345/168–172; 455/566
See application file for complete search history.

(56) References Cited

U.S. PATENT DOCUMENTS 5,952,942 A * 9/1999 Balakrishnan et al. ......... 341/20
8,547,337 B2 * 10/2013 Yoon ............................. 345/168
2006/0230347 A1 10/2006 Han

FOREIGN PATENT DOCUMENTS

KR    1020020007852 A    7/2000
WO    2010036056 A2    4/2010

* cited by examiner

*Primary Examiner* — Lun-Yi Lao
*Assistant Examiner* — Jarurat Suteerawongsa
(74) *Attorney, Agent, or Firm* — Amin, Turocy & Watson, LLP

(57) ABSTRACT

There is provided an alphabetic character input apparatus including a data storage unit configured to store therein alphabetic character assignment information of each of keys in an alphabetic character input section and a program for inputting an alphabetic character; a key input unit configured to detect a key manipulation signal of a user to select an alphabetic character assigned to each of the keys; and a memory configured to store therein alphabetic character assignment information of a key corresponding to a key manipulation signal lately input by the user such that the alphabetic character assignment information of the key is assigned to a clone key.

10 Claims, 6 Drawing Sheets

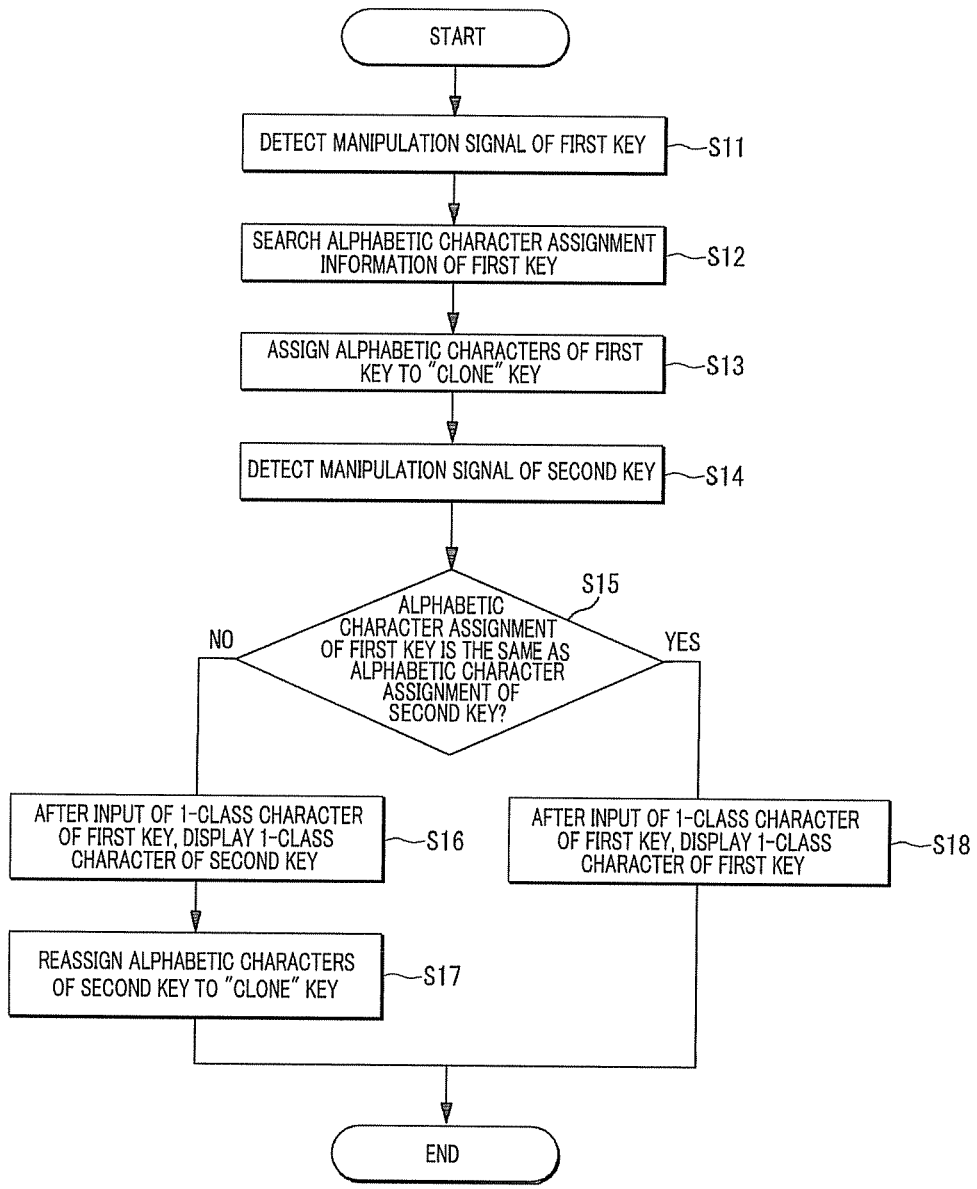

ALPHABETIC CHARACTER INPUT APPARATUS AND METHOD THEREOF

TECHNICAL FIELD

The present invention relates to an alphabetic character input apparatus and method thereof, and more particularly, relates to an alphabetic character input apparatus and method using a clone key to which the same alphabetic characters as alphabetic characters on a key last pressed by a user are assigned in a mobile device.

BACKGROUND ART

As a mobile device is generally used, various methods of using the mobile device have been suggested. Except a voice call, the most commonly used service for a user of the mobile device is text message transmission service such as a SMS (Short Message Service). The text message transmission service allows information to be transmitted readily and quickly to the other party at low costs. A mobile device is equipped with a keypad having a limited number of keys, and, thus, it is very complicated to input characters by using the keys. Particularly, if plural characters are assigned to a single key, a required character is selected by pressing a keypad several times.

Recently, character input has been required in various input/edit modes, and, thus, it becomes common to select and input more characters than a physical number of keys on a keypad by using a fixed number of keys.

FIG. 1 shows a conventional mobile device for inputting alphabetic characters.

Referring to FIG. 1, a conventional mobile device 10 includes a function key section 20 and a keypad section 30.

The function key section 20 includes one or more function keys such as a menu key, a search key, a send key, an end key, and direction keys.

The keypad section 30 has a basic configuration of a 4 by 3 matrix of twelve keys including ten numeric keys 0 to 9 and two control keys labeled "*" (hereinafter, referred to as "* key") and "#" (hereinafter, referred to as "# key") and each of the numeric keys 1 to 9 is also assigned three or four alphabetic characters in order to input alphabetic characters.

In the keypad of the conventional mobile device, a single key is assigned three or four alphabetic characters. Therefore, in order to repeatedly input the same alphabetic character or successively input alphabetic characters assigned on a single key, a user displays one of the alphabetic characters by a manipulation of the key and needs to wait for a predetermined waiting time, such as about one second, required for the displayed alphabetic character to be recognized as an input character, and then inputs the next alphabetic character by pressing the same key again.

By way of example, in order to input alphabetic characters "ABCD", with a predetermined time, such as about one second, after the user presses the numeric key "2" once, the first alphabetic character "A" is input and with a predetermined time, such as about one second, after the user presses the numeric key "2" successively twice, the second alphabetic character "B" is input and then the third alphabetic character "C" is input by pressing the numeric key "2" successively three times and finally, the fourth alphabetic character "D" is input by pressing the numeric key "3" once. The user can be informed that such a waiting time elapses by a flicker or a movement of a cursor.

That is, it takes the waiting time of about two seconds to input the alphabetic characters "ABCD". The waiting time of about two seconds may be longer when a long sentence is input. A user good at typing keys may feel like that such a waiting time is a much longer and may be frustrated at several halts while inputting characters.

If the keypad is pressed more quickly than the waiting time, an unwanted character is input.

In order to ease such inconvenience in inputting characters, Korean Patent Laid-open Publication No. 10-20002-0007852 discloses "a method of inputting characters of a mobile device and a mobile device using the same method" in which plural "shift" keys correspond to an assignment order of characters on a single key and a certain character is input by pressing one of the "shift" key corresponding to an assignment order of the character before inputting the character.

Although this disclosure suggests a technique of selecting and inputting each of the characters on the single key by using the plural "shift" keys, in order to input any one of three or four alphabetic characters on the single key, a separate "shift" key is additionally needed, which becomes a burden for design of a mobile device.

Further, in the above-mentioned method, a user needs to recognize an assignment order of a character and needs to select and input one of the plural "shift" keys every time before a character is input. Therefore, it may take a longer time for a user who is not good at typing keys to input characters.

DISCLOSURE OF THE INVENTION

Problems to Be Solved by the Invention

An embodiment of the present invention provides an alphabetic character input apparatus and method using a clone key to which the same alphabetic characters as alphabetic characters on a key last pressed by a user of a mobile device are assigned and which makes it easy to input a required alphabetic character.

Means for Solving the Problems

As a means for solving the above-described problem, in accordance with a first embodiment of the present invention, there is provided an alphabetic character input apparatus including: a data storage unit configured to store therein alphabetic character assignment information of each of keys in an alphabetic character input section and a program for inputting an alphabetic character; a key input unit configured to detect a key manipulation signal of a user to select an alphabetic character assigned to each of the keys; and a memory configured to store therein alphabetic character assignment information of a key corresponding to a key manipulation signal lately input by the user such that the alphabetic character assignment information of the key is assigned to a clone key. Here, the clone key is recognized as a different key from the key, in the alphabetic character input section to which the same alphabetic character as an alphabetic character assigned to the clone key is assigned, and an alphabetic character displayed by a manipulation of the key in the alphabetic character input section is not changed into another alphabetic character by a manipulation of the clone key.

As a means for solving the above-described problem, in accordance with a second embodiment of the present invention, there is provided an alphabetic character input apparatus using a keypad. The keypad includes: an alphabetic character input section configured to be assigned two or more alphabetic characters; and a clone key configured to be assigned alphabetic character assignment information corresponding to a key in the alphabetic character input section when a manipulation signal of the key in the alphabetic character input section is detected. Here, the clone key is recognized as a different key from the key in the alphabetic character input section to which the same alphabetic character as alphabetic character assigned to the clone key is assigned, and an alphabetic character displayed by a manipulation of the key of the alphabetic character input section is not changed into another alphabetic character by a manipulation of the clone key.

As a means for solving the above-described problem, in accordance with a third embodiment of the present invention, there is provided an alphabetic character input method including: assigning at least two alphabetic characters to each of plural keys; designating one key to which alphabetic characters are not assigned as a clone key; assigning the clone key alphabetic character assignment information corresponding to one of the keys to which alphabetic characters are assigned when a manipulation signal of the key is detected; and displaying an alphabetic character corresponding to alphabetic character assignment information assigned to the clone key when a manipulation of the clone key is detected. Here, the clone key is recognized as a different key from the key in the alphabetic character input section to which the same alphabetic character as an alphabetic character assigned to the clone key is assigned, and an alphabetic character displayed by a manipulation of the key is not changed into another alphabetic character by a manipulation of the clone key.

Effect of the Invention

In accordance with one of the means for solving the problem, a required alphabetic character can be input readily by using a clone key to which the same alphabetic characters as alphabetic characters on a key last pressed by a user of a mobile device are assigned.

BRIEF DESCRIPTION OF THE DRAWINGS

FIG. 7 is a flowchart for explaining an alphabetic character input method in accordance with an embodiment of the present invention.

BEST MODE FOR CARRYING OUT THE INVENTION

Figure 1:
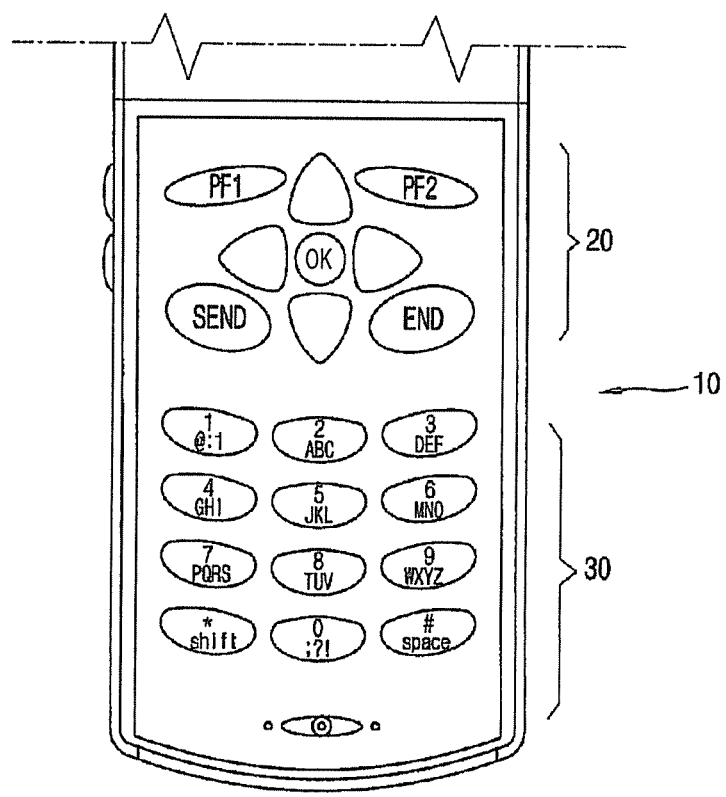
FIG. 1 shows a conventional mobile device for inputting alphabetic characters.

Hereinafter, embodiments of the present invention will be described in detail with reference to the accompanying drawings so that the present invention may be readily implemented by those skilled in the art. However, it is to be noted that the present invention is not limited to the embodiments but can be realized in various other ways. In the drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, the term "comprises or includes" and/or "comprising or including" used in the document means that one or more other components, steps, operation and/or existence or addition of elements are not excluded in addition to the described components, steps, operation and/or elements.

In the specification and claims, the term "character display" means a display of one of alphabetic characters on a single key by pressing the single key until input of the character is determined. That is, the displayed alphabetic character is not yet determined to be input and input of the displayed character is determined after a predetermined waiting time elapses or when a character on another key is displayed. Such a display state of the character may be indicated by a flicker for the predetermined waiting time or a movement of a cursor.

Further, the term "character input" means a state where input of a character displayed on a screen of a mobile device is determined. That is, since a completely input alphabetic character is not influenced by manipulation of the same key assigned the alphabetic character, even if a signal to manipulate the same key is detected, the alphabetic character is not changed to other alphabetic characters.

Generally, a keypad employed in a mobile device has a basic configuration of a 4 by 3 matrix of twelve keys including ten numeric keys 0 to 9 and two control keys labeled "*" (hereinafter, referred to as "* key") and "#" (hereinafter, referred to as "# key") and each of the numeric keys 1 to 9 also is assigned at least two alphabetic characters in order to input alphabetic characters. The number and assignment of the keys are internationally standardized to input numbers and alphabetic characters. Hereinafter, such a standardized keypad will be referred to as "ten-key keypad" or briefly as "keypad".

In a keypad employing a character input method in accordance with an embodiment of the present invention, a multiple number of classes can be arranged on a single key. In the present specification, the term "class" means a class to which alphabetic characters belong. That is, if a single alphabetic character is positioned on a single key, it is called as "1-class assignment"; if two alphabetic characters are arranged on a single key, it is called as "2-class assignment"; if three alphabetic characters are arranged on a single key, it is called as "3-class assignment"; and if four alphabetic characters are arranged on a single key, it is called as "4-class assignment".

If two or more alphabetic characters are assigned on the same key, each of the alphabetic characters can be selected depending on the number of pressing the key such as an one-time press, a successive two-time press and a successive three-time press. Hereinafter, referring to FIGS. 2 to 6, an alphabetic character input apparatus and method in accordance with an embodiment of the present invention will be explained.

Figure 2:
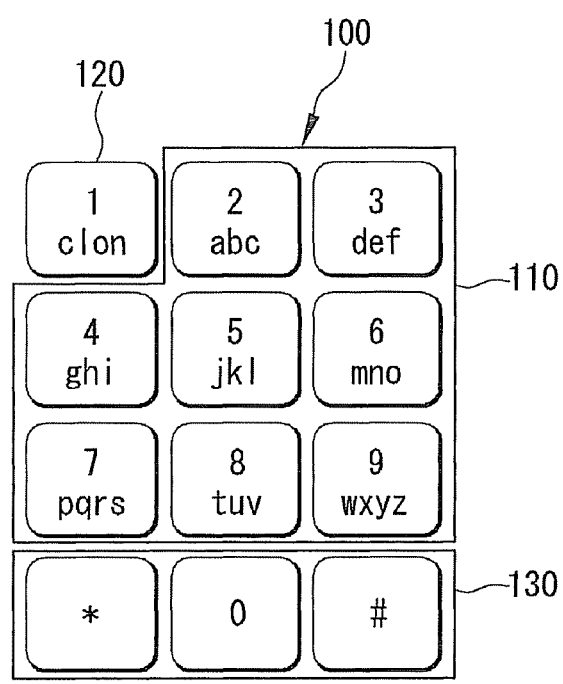
FIG. 2 is an explanatory diagram for describing a keypad of a mobile device in accordance with an embodiment of the present invention.

FIG. 2 is an explanatory diagram for describing a keypad of a mobile device employing an alphabetic character input method in accordance with an embodiment of the present invention.

Referring to FIG. 2, a keypad 100 may include an alphabetic character input section 110, a clone key 120, and a function key input section 130.

The alphabetic character input section 110 may include a multiple number of, for example, eight numeric keys 2 to 9 among twelve keys on the keypad to input twenty six alphabetic characters and each of the keys is assigned one or more alphabetic characters. By way of example, in the alphabetic character input section 110, the numeric key "2" may be assigned alphabetic characters "abc", the numeric key "3" may be assigned alphabetic characters "def", the numeric key "4" may be assigned alphabetic characters "ghi", the numeric key "5" may be assigned alphabetic characters "jkl", the numeric key "6" may be assigned alphabetic characters "mno", the numeric key "7" may be assigned alphabetic characters "pqrs", the numeric key "8" may be assigned alphabetic characters "tuv", and the numeric key "9" may be assigned alphabetic characters "wxyz".

The clone key 120 is assigned the same alphabetic characters as alphabetic characters on a key of the alphabetic character input section 110 lately pressed by a user, and the clone key 120 may be any one of the twelve keys on the keypad which is not assigned any alphabetic character. Here, the clone key 120, i.e., the "clone" key is assigned the same alphabetic characters as alphabetic characters on a key of the alphabetic character input section 110 last pressed by the user but recognized as a different key from the keys of the alphabetic character input section 110. That is, an alphabetic character displayed by manipulation of a key of the alphabetic character input section 110 is not changed by manipulation of the "clone" key. By way of example, after the alphabetic character "a" is displayed by pressing a numeric key "2", even if the "clone" key is pressed once within a predetermined waiting time, the already displayed alphabetic character "a" is not changed to "b", and "a" and "a" are respectively input.

The function key input section 130 may include three keys of the "*" key, a numeric key "0" and the "#" key. The "*" key may be used to change an alphabetic character from/to a small letter to/from a capital letter, the numeric key "0" may be used as a space key to enter an space between words, and the "#" key may be used to change an alphabetic character to/from a number. Here, the numeric key "0" and the "#" key may be assigned frequently used symbols such as "_", """, "!", "?" and "1", ".", ",", ":", "@", respectively.

Figure 3:
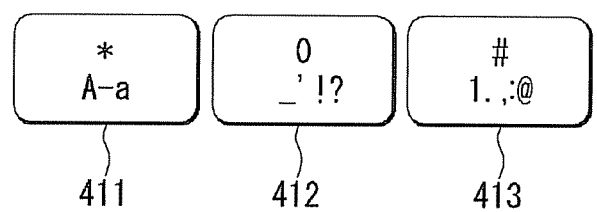
FIG. 3 is an example of a function key input section in accordance with an embodiment of the present invention.

FIG. 3 shows an example of the function key input section 130.

The assignment and kinds of the keys shown in FIGS. 2 and 3 are just examples for illustration but not limited thereto.

Figure 4:
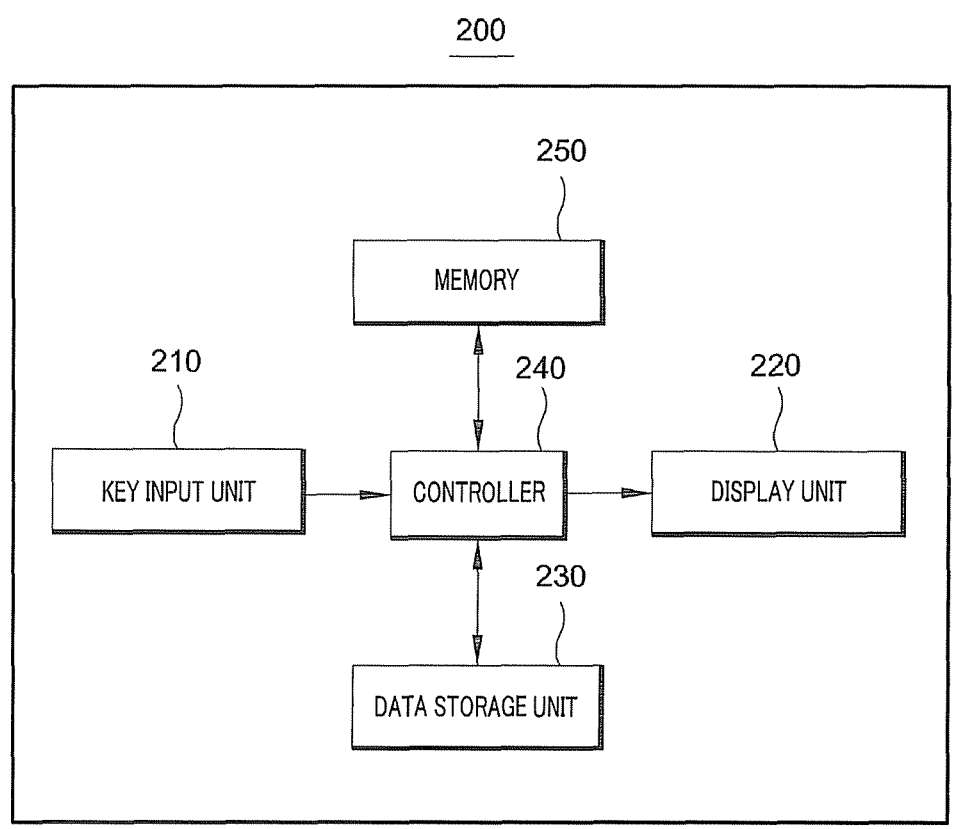
FIG. 4 is a detailed configuration view of an alphabetic character input apparatus in accordance with an embodiment of the present invention.

FIG. 4 is a detailed configuration view of an alphabetic character input apparatus in accordance with an embodiment of the present invention.

Referring to FIG. 4, an alphabetic character input apparatus 200 may include a key input unit 210, a display unit 220, a data storage unit 230, a controller 240 and a memory 250.

The key input unit 210 may detect a user's key manipulation signal to select numbers, characters and symbols assigned to each key on the keypad and transmit the detected signal to the controller 240.

The display unit 220 may display various kinds of information such as numbers, characters and symbols input by the user on a screen of the alphabetic character input apparatus 200.

The data storage unit 230 may store various kinds of process data relevant to operations of the controller 240 for operating the alphabetic character input apparatus 200 and a program for inputting alphabetic characters.

The memory 250 may store alphabetic character assignment information on a key last pressed such that alphabetic character assignment information of a key corresponding to a key manipulation signal lately input by the user is assigned to the "clone" key. The memory 250 may employ both a volatile memory and a non-volatile memory and may be provided as a single unit with the data storage unit 230.

The controller 240 may overall control the operation of the alphabetic character input apparatus 200 and assign the same alphabetic characters as alphabetic characters, which are assigned to a last pressed key and stored in the memory 250, to the clone key 120 based on the user's key manipulation signal detected by the key input unit 210.

Hereinafter, referring to FIG. 5, there will be explained an alphabetic character input method in accordance with an embodiment of the present invention.

Figure 5:
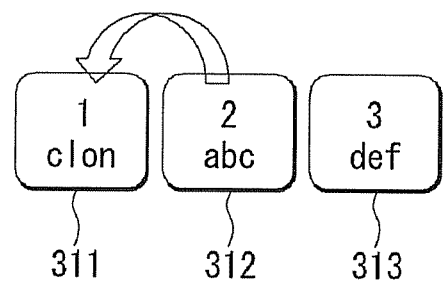
FIGS. 5 and 6 are explanatory diagrams for describing an alphabetic character input method in accordance with an embodiment of the present invention.

FIG. 5 is an explanatory diagram for describing an alphabetic character input method in accordance with an embodiment of the present invention.

If the user presses the numeric key "2" (312) having a 3-class assignment with alphabetic characters "abc", the same alphabetic characters "abc" as the alphabetic characters assigned to the numeric key "2" are assigned to the numeric key "1" (311), i.e., the "clone" key as depicted in FIG. 5.

By way of example, in order to input alphabetic characters "aaa", the first alphabetic character is input by pressing the numeric key "2" (312) once and the second alphabetic character "a" is input by pressing the numeric key "1" (311), i.e., the "clone" key once and then the third alphabetic character "a" is input by pressing the numeric key "2" once.

In a conventional alphabetic character input method, in order to input alphabetic characters "aaa", with a predetermined waiting time, such as about one second, after the user presses the numeric key "2" (312) once, the first alphabetic character "a" is input and with a predetermined waiting time, such as about one second, after the user presses the numeric key "2" once, the second alphabetic character "b" is input and then the third alphabetic character "c" is input by pressing the numeric key "2" (312) once. That is, in the conventional alphabetic character input method, it takes the waiting time of about two seconds in total to input the alphabetic characters "aaa", whereas in the alphabetic character input method in accordance with the embodiment of the present invention, even if the same alphabetic character is repeatedly input, the waiting time required for an alphabetic character displayed by key manipulation of the user to be input is not needed.

Figure 6:
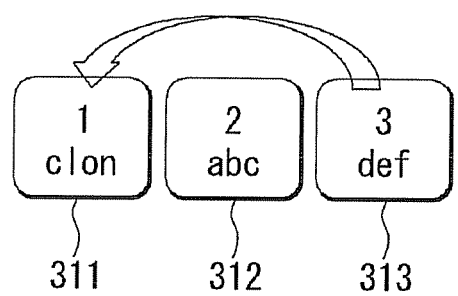

If the user presses the numeric key "3" (313) having a 3-class assignment with alphabetic characters "def", the same alphabetic characters "def" as the alphabetic characters assigned to the numeric key "3" are assigned to the numeric key "1" (311), i.e., the "clone" key as depicted in FIG. 6.

By way of example, in order to input alphabetic characters "def", the first alphabetic character "d" is input by pressing the numeric key "3" (313) once and the second alphabetic character "e" is input by pressing the numeric key "1" (311), i.e., the "clone" key successively twice and then the third alphabetic character "f" is input by pressing the numeric key "3" successively three times.

In the conventional alphabetic character input method, in order to input alphabetic characters "def", with a predetermined waiting time, such as about one second, after the user presses the numeric key "3" (313) once, the first alphabetic character "d" is input and with a predetermined waiting time, such as about one second, after the user presses the numeric key "3" (313) once, the second alphabetic character "e" is input and then the third alphabetic character "f" is input by pressing the numeric key "3" (313) once. That is, in the conventional alphabetic character input method, it takes the waiting time of about two seconds in total to input the alphabetic characters "def", whereas in the alphabetic character input method in accordance with the embodiment of the present invention, even if two or more alphabetic characters assigned to a single key are successively input, the waiting time required for an alphabetic character displayed by key manipulation of the user to be input is not needed.

Likewise, by way of example, in order to input alphabetic characters "abc", the first alphabetic character "a" is input by pressing the numeric key "2" (312) once and the second alphabetic character "b" is input by pressing the numeric key "1" (311), i.e., the "clone" key successively twice and then the third alphabetic character "c" is input by pressing the numeric key "2" (312) successively three times.

Further, by way of example, in order to input alphabetic characters "abba", the first alphabetic character "a" is input by pressing the numeric key "2" (312) once and the second alphabetic character "b" is input by pressing the numeric key "1" (311), i.e., the "clone" key successively twice and then the third alphabetic character "b" is input by pressing the numeric key "2" (312) successively twice and finally, the fourth alphabetic character "a" is input by pressing the numeric key "1".

Furthermore, by way of example, in order to input alphabetic characters "adef", the first alphabetic character "a" is input by pressing the numeric key "2" (312) once and the second alphabetic character "d" is input by pressing the numeric key "3" once and then the third alphabetic character "e" is input by pressing the numeric key "1", i.e., the "clone" key successively twice and finally, the fourth alphabetic character "f" is input by pressing the numeric key "3" successively three times.

There has been explained a case that alphabetic characters are input by using the "clone" key, and even if symbols assigned to the numeric key "0" and the "#" key of the function key input section 130 are needed to be input, it is easy to input the symbols by using the "clone" key. By way of example, in order to input symbols "?!?", the first symbol "?" is input by pressing the numeric key "0" successively four times. Since the same symbols "_,'!?" as symbols assigned to the numeric key "0" are assigned to the "clone" key, the second symbol "!" is input by pressing the "clone" key, i.e., the numeric key "1" successively three times and the third symbol "?" is input by pressing the numeric key "0" successively four times.

FIG. 7 is a flowchart for explaining an alphabetic character input method using a mobile device in accordance with an embodiment of the present invention. Here, a first key may be physically different from a second key, and each of the first key and the second key may include a "clone" key.

Above all, in step S11, the alphabetic character input apparatus 200 may detect a manipulation signal of the first key through the key input unit 210, and then the process proceeds to step S12 and the alphabetic character input apparatus 200 may search alphabetic character assignment information of the first key of which the manipulation signal is detected.

In step S13, based on the first key's alphabetic character assignment information searched in step S12, the alphabetic character input apparatus 200 may assign corresponding alphabetic characters to the "clone" key.

In step S14, the alphabetic character input apparatus 200 may detect a manipulation signal of the second key through the key input unit 210, and then the process proceeds to step S15 and the alphabetic character input apparatus 200 may determine whether alphabetic character assignment information of the second key of which the manipulation signal is detected is the same as the alphabetic character assignment information of the first key.

As a result of the determination in step S15, if the alphabetic character assignment information of the second key is different from that of the first key, the process proceeds to step S16. After a 1-class character of the first key is input, a 1-class character of the second key is displayed, and then the process proceeds to step S17 and the alphabetic characters assigned to the second key are reassigned to the "clone" key.

The above-described steps S16 and S17 are relevant to a case that the second key is not the "clone" key. By way of example, the first key may be the numeric key "2" assigned alphabetic characters "abc" and the second key may be the numeric key "3" assigned alphabetic characters "def", the alphabetic character input apparatus 200 may input the alphabetic character "a" arranged in a 1-class of the first key, i.e., the numeric key "2", display the alphabetic character "d" arranged in a 1-class of the second key, i.e., the numeric key "3", search alphabetic character assignment information of the second key, i.e., the numeric key "3" and reassign the alphabetic characters "def" corresponding to the searched information to the "clone" key.

Returning to FIG. 7, as a result of the determination in step S15, if the alphabetic character assignment information of the second key is the same as that of the first key, the process proceeds to step S18. After the 1-class character of the first key is input, the 1-class character of the first key is displayed. That is, step S18 is relevant to a case that the second key is the "clone" key. By way of example, if the first key is the numeric key "2" assigned the alphabetic characters "abc", the alphabetic character input apparatus 200 inputs the alphabetic character "a" arranged in a 1-class of the first key, i.e., the numeric key "2" and displays the alphabetic character "a" arranged in a 1-class of the second key, i.e., the "clone" key.

The process in FIG. 7 shows a case that the first key is a certain key assigned alphabetic characters and the second key is the "clone" key, but this process can be applied to a case that the first key is the "clone" key and the second key is a certain key assigned alphabetic characters. In this case, however, alphabetic characters have already been assigned to the "clone" key and if the first key of which an input signal is detected is the "clone" key, the above-described steps S12 and 513 are omitted from the process.

Although for the sake of convenience in explanation, there has been explained a case that a 1-class character of each key is input, a 1-class character, a 2-class character, or a 3-class character assigned to each single key can be input by varying the number of pressing the key, i.e., an one-time press, a successive two-time press or a successive three-time press. By way of example, if the first key, i.e., the numeric key "2" is pressed successively twice, a 2-class character "b" of the numeric key "2" is displayed on the screen of the alphabetic character input apparatus 200. At the same time, alphabetic characters "abc" assigned to the numeric key "2" are assigned to the second key, i.e., the "clone" key. Thereafter, if it is detected that the second key, i.e., the "clone" key is manipulated, the displayed alphabetic character "b" is completely input and one of the assigned alphabetic characters "abc" can be input depending on the number of pressing the "clone" key. By way of example, the alphabetic character "a" is input in case of an one-time press of the "clone" key, the alphabetic character "b" is input in case of a successive two-time press, and the alphabetic character "c" is input in case of a successive three-time press.

The embodiment of the present invention can be embodied in a storage medium including instruction codes executable by a computer such as a program module executed by the computer. Besides, the data structure in accordance with the embodiment of the present invention can be stored in the storage medium executable by the computer. A computer readable medium can be any usable medium which can be accessed by the computer and includes all volatile/non-volatile and removable/non-removable media. Further, the computer readable medium may include all computer storage and communication media. The computer storage medium includes all volatile/non-volatile and removable/non-removable media embodied by a certain method or technology for storing information such as computer readable instruction code, a data structure, a program module or other data. The communication medium typically includes the computer readable instruction code, the data structure, the program module, or other data of a modulated data signal such as a carrier wave, or other transmission mechanism, and includes a certain information transmission medium.

The above description of the present invention is provided for the purpose of illustration, and it would be understood by those skilled in the art that various changes and modifications may be made without changing technical conception and essential features of the present invention. Thus, it is clear that the above-described embodiments are illustrative in all aspects and do not limit the present invention. For example, each component described to be of a single type can be implemented in a distributed manner. Likewise, components described to be distributed can be implemented in a combined manner.

The scope of the present invention is defined by the following claims rather than by the detailed description of the embodiment. It shall be understood that all modifications and embodiments conceived from the meaning and scope of the claims and their equivalents are included in the scope of the present invention.

What is claimed is:

1. An alphabetic character input apparatus comprising:
a data storage unit configured to store therein alphabetic character assignment information of each of keys in an alphabetic character input section and a program for inputting an alphabetic character;
a key input unit configured to detect a key manipulation signal of a user to select an alphabetic character assigned to each of the keys;
a memory configured to store therein alphabetic character assignment information of a key in the alphabetic character input section corresponding to a key manipulation signal lately input by the user; and
a clone key configured to be assigned the same alphabetic characters as alphabetic characters non the key corresponding to the key manipulation signal lately input by the user,
wherein the clone key is recognized as a different key from the keys of the alphabetic character input section, and an alphabetic character displayed by a manipulation of the key in the alphabetic character input section is not changed into another alphabetic character by a manipulation of the clone key.

2. The alphabetic character input apparatus of claim 1, wherein an alphabetic character displayed by the manipulation of the clone key is not changed into another alphabetic character by the manipulation of the key in the alphabetic character input section.

3. The alphabetic character input apparatus of claim 1, further comprising:
a display unit configured to display an alphabetic character input by the user on a screen.

4. An alphabetic character input apparatus using a keypad, wherein the keypad includes:
a plurality of keys in an alphabetic character input section, each key in the plurality of keys configured to be assigned two or more alphabetic characters; and
a clone key configured to be assigned the same alphabetic characters as alphabetic characters on a key in the alphabetic character input section when a manipulation signal of the key in the alphabetic character input section is detected,
wherein the clone key is recognized as a different key from the key in the alphabetic character input section to which the same alphabetic characters as alphabetic characters assigned to the clone key are assigned, and an alphabetic character displayed by a manipulation of the key of the alphabetic character input section is not changed into another alphabetic character by a manipulation of the clone key.

5. The alphabetic character input apparatus of claim 4,
wherein the keypad further includes a function key input section configured to be assigned two or more symbols, and
a symbol displayed by a manipulation of a key in the function key input section is not changed into another symbol by the manipulation of the clone key.

6. An alphabetic character input method comprising:
assigning at least two alphabetic characters to each of plural keys, the plural keys located in alphabetic character input section;
designating one key which is not located in the alphabetic character input section as a clone key;
assigning the clone key alphabetic characters as alphabetic characters on a key when a manipulation signal of the key is detected, the key being one of the plural keys; and
displaying an alphabetic character corresponding to alphabetic character assignment information assigned to the clone key when a manipulation of the clone key is detected,
wherein the clone key is recognized as a different key from the plural keys, and an alphabetic character displayed by a manipulation of the key is not changed into another alphabetic character by a manipulation of the clone key.

7. The alphabetic character input method of claim 6, wherein one of alphabetic characters assigned to the key is selected depending on a number of pressing the key.

8. The alphabetic character input method of claim 7, wherein the displayed alphabetic character is automatically input after a predetermined waiting time elapses.

9. The alphabetic character input method of claim 6, wherein input of the alphabetic character displayed by the manipulation of the key to which alphabetic characters are assigned is determined by a manipulation of another one of the keys to which alphabetic characters are assigned.

10. A symbol input apparatus using a keypad,
wherein the keypad includes:
a plurality of keys in a symbol input section, each key of the plurality of keys configured to be assigned two or more symbols; and
a clone key configured to be assigned the same symbols as a key in the symbol input section when a manipulation signal of the key in the symbol input section is detected, the key being one of plurality of keys,
wherein the clone key is recognized as a different key from the key in the symbol input section to which the same symbols as the symbols assigned to the clone key are assigned, and a symbol displayed by a manipulation of the key in the symbol input section is not changed into another symbol by a manipulation of the clone key.

* * * * *